United States Patent
Wilz (10) Patent No.: US 7,962,104 B1
(45) Date of Patent: Jun. 14, 2011

(54) RECEIVER SENSITIVITY FOR TRANSCEIVER HAVING DIVERSITY ARCHITECTURE

(75) Inventor: Leo John Wilz, Walford, IA (US)

(73) Assignee: Intermec IP Corp., Everett, WA (US)

( * ) Notice: Subject to any disclaimer, the term of this patent is extended or adjusted under 35 U.S.C. 154(b) by 628 days.

(21) Appl. No.: 11/675,471

(22) Filed: Feb. 15, 2007

Related U.S. Application Data (63) Continuation of application No. 09/061,441, filed on Apr. 16, 1998, now abandoned.

(60) Provisional application No. 60/044,249, filed on Apr. 23, 1997.

(51) Int. Cl.
*H04B 1/44* (2006.01)
(52) U.S. Cl. .......... 455/78; 455/101; 455/132; 455/141; 455/144
(58) Field of Classification Search .............. 455/78, 455/101, 132.141, 144; 375/316, 340, 347; 714/797
See application file for complete search history.

(56) References Cited

U.S. PATENT DOCUMENTS

| 5,742,680 A | * | 4/1998 | Wilson ........................... 380/227 |
| 6,018,651 A | * | 1/2000 | Bruckert et al. ........... 455/277.1 |

* cited by examiner

*Primary Examiner* — Nghi H Ly
(74) *Attorney, Agent, or Firm* — Paul A. Maltseff; John H. Sherman (57) ABSTRACT

A communications transceiver incorporating diversity architecture for utilization with a wireless communications network and having improved receiver sensitivity is disclosed. In a first embodiment of the invention, the communications transceiver comprises a pair of antennas connected to a pair of amplifiers and a selector connected between the amplifiers and the intermediate frequency stage of the transceiver for providing selective operation of the communications transceiver with either antenna of the pair of antennas. In a second embodiment of the invention, the communications transceiver comprises a pair of antennas, a pair of amplifiers and a selector disposed between the first amplifier and the intermediate frequency stage of the transceiver and between the second antenna and the second amplifier for providing selective operation of the communications transceiver with either of the antennas. The architecture of the communications transceiver of the present invention provides improved receiver selectivity, improved noise figure, improved signal-to-noise ration, and improved power output.

16 Claims, 7 Drawing Sheets

RECEIVER SENSITIVITY FOR TRANSCEIVER HAVING DIVERSITY ARCHITECTURE

CROSS-REFERENCE TO RELATED APPLICATION

The present application claims the benefit under 35 U.S.C. §119(e) to provisional application Ser. No. 60/044,249 filed Apr. 23, 1997. Said provisional application Ser. No. 60/044,249 is hereby incorporated by reference in it entirety.

BACKGROUND OF THE INVENTION

The present invention generally relates to the field of wireless communications, and more particularly to a transceiver having improved receiver architecture.

There are many applications in which it is desirable to be able to provide wireless communications. For example, in an industrial warehouse environment individual roaming workers may utilize portable data terminals for inventory tracking and accounting purposes. The warehouse worker must be mobile, having the freedom of movement throughout any position in the warehouse to reach the product location, yet remain in constant communication with a central or host computer over a local network. In such an application, it is desirable for the mobile data terminal to communicate with the host computer over the central network via wireless communications, for example by using a radio-frequency transceiver. Thus, an interface device, or access point, may be utilized to serve as an interface between a wireless and a directly linked communication network.

It is often desirable for a network interface device to utilize several forms of communications media. For example, it may be desirable to provide an access point interface to utilize two individual radio-frequency transceivers for providing communications at two different frequencies simultaneously. Such a transceiver may transmit on a first frequency and receive on a second frequency in order to provide full duplex communications, avoid interference, etc.

A communication transceiver typically requires or preferably utilizes duplex communications wherein information is both transmitted and received by a single unit transceiver unit and wherein the transmitter apparatus and receiver apparatus of the transceiver share common hardware and resources. In such a transceiver, selection between the transmitter and receiver is implemented via switching and electronic enabling of the required hardware devices. However, because of the loading and cross talk effects caused by the sharing of common hardware and from the use of switches, increased noise may be introduced into the communication signal, the signal-to-noise ratio may decreased and the noise figure of the signal may be increased correspondingly. Lower signal-to-noise ratios adversely affect maximum transmission ranges and increased noise figures result in an increase in transmission error rates because of maximum power limits mandated by government regulations and other design constraints.

SUMMARY OF THE INVENTION

Accordingly, it is a goal of this invention to provide a method and apparatus for improving the signal-to-noise ratio and reducing the noise figure of a wireless communications transceiver which utilizes dual transceiver and receiver architecture wherein multiple or diversity architecture may be utilized.

The transceiver architecture of the present invention may be utilized in a base station transceiver or a mobile transceiver unit of a mobile radio data communication system, or in similar devices and systems, as disclosed in U.S. Pat. No. 5,483,676 issued Jan. 9, 1996, said U.S. patent being assigned to the entity to whom the present invention and application are subject to obligation of assignment. Said U.S. Pat. No. 5,483,767 is hereby incorporated by reference herein in its entirety.

The transceiver architecture of the present invention may be utilized in a data transceiver module for digital communications such as a spread spectrum transceiver module utilizing multiple mode transmission as disclosed in PCT Publication No. WO 96/38925 published Dec. 5, 1996, said PCT publication being assigned to the entity to whom the present invention and application are subject to obligation of assignment.

It is to be understood that both the foregoing general description and the following detailed description are exemplary and explanatory only and are not restrictive of the invention as claimed.

The accompanying drawings, which are incorporated in and constitute a part of the specification, illustrate an embodiment of the invention and together with the general, description, serve to explain the principles of the invention.

BRIEF DESCRIPTION OF THE DRAWINGS

The numerous objects and advantages of the present invention may be better understood by those skilled in the art by reference to the accompanying figures in which.

DESCRIPTION OF THE PREFERRED EMBODIMENT

Reference will now be made in detail to the presently preferred embodiment of the invention, an example of which is illustrated in the accompanying drawings.

Figure 1:
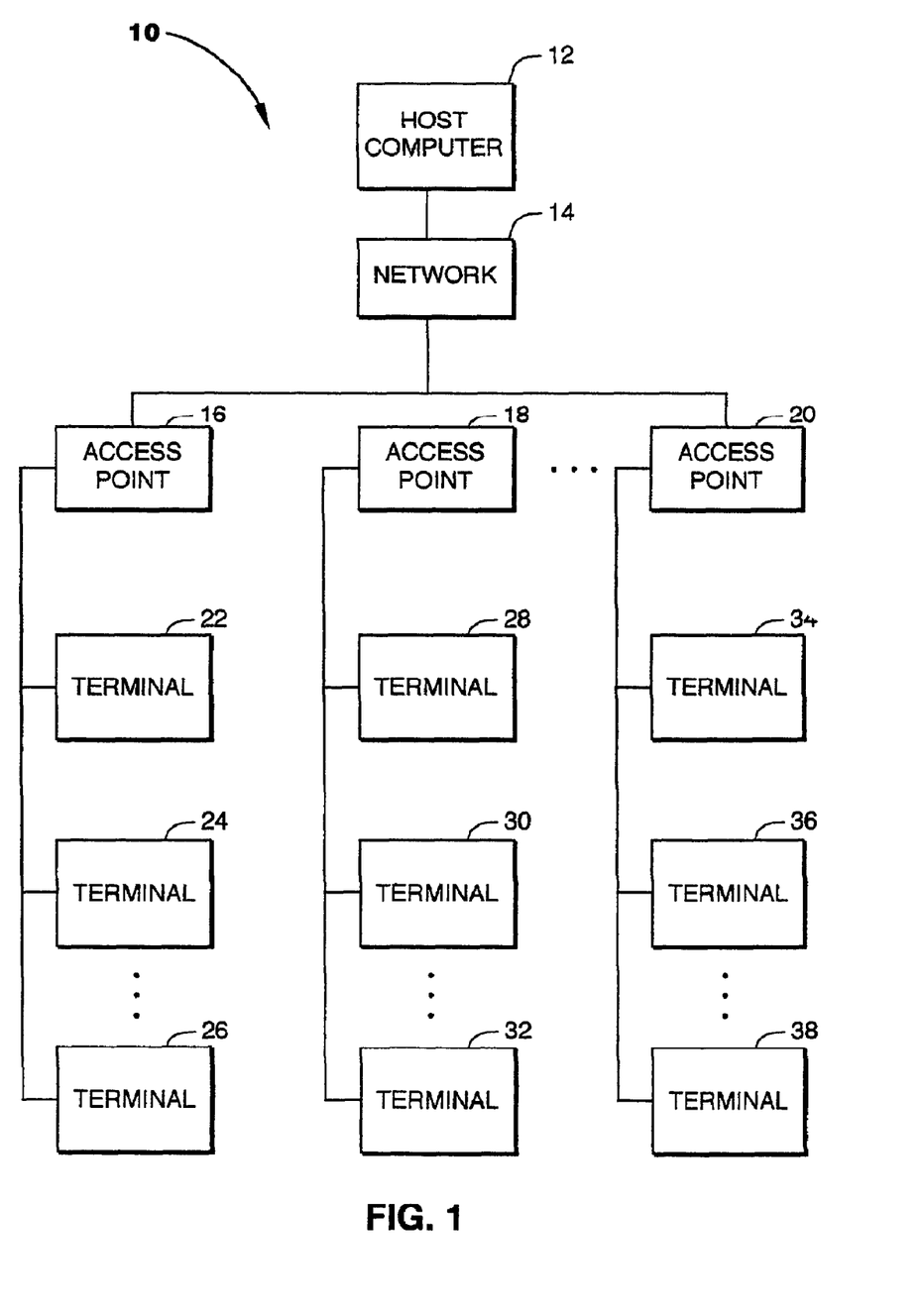
FIG. 1 is an illustration of a multilevel communications system in accordance with the present invention.

Referring now to FIG. 1, a multilevel communications system in accordance with the present invention is shown. The multileveled communication system 10 typically comprises a central host computer ("HOST COMPUTER") 12 functioning as a main sever for performing computationally intensive and time consuming processing tasks, centralized mass storage functions, network management and control tasks and the like, etc. The central host computer 12 may be any of a variety of commercially available central computers or servers, for example a VAX mainframe or Alpha Server available from Digital Corporation, an AS/400, RS/6000 or S/390 server available from IBM Corporation, or the like kind of server. The central computer 12 hosts, implements and controls a centralized local network ("NETWORK") 14 for providing a linkage between several communication channels. A plurality of network access points ("ACCESS POINT") 16, 18 and 20 may be connected to the network 14, each providing an access node to the host computer 10 through the network 14.

Each of the network access points may be capable of functioning as a point of access for individual computer terminals ("TERMINAL"). For example, access point 16 may provide network interfacing functions for terminals 22, 24 and 26; access point 18 may provide network interfacing functions for terminals 28, 30 and 32; and access point 20 may provide network interfacing functions for terminals 34, 36 and 38.

The network 14 as illustrated in FIG. 1 and as referred to herein preferably refers to any type of widely utilized local area network (LAN) and may be equally applicable to any type of widely utilized wide area network (WAN). Such network may be, for example, a type of network referred to as "Ethernet" which operates according to standards promulgated by the Institute of Electrical and Electronics Engineers (IEEE) such as any IEEE 802.3 standard. Further, any IEEE promulgated network standard may be utilized. For example, the network 14 may be a commonly utilized 10Base-T, 10Base-2 or 10Base-Ethernet having data transmission rates on the order of 10 megabits per second (10-Mbps). Alternatively, the network 14 may be a Fast Ethernet, or 100Base-T, network having data transmission rates on the order of 100 megabits per second (100-Mbps). The network 14 may preferably be a Gigabit Ethernet network having data transmission rates on the order of one gigabit per second (1-Gbps) according to the Gigabit Ethernet Standard IEEE 802.3z as the standard becomes widely utilized. The network may further implement other types of available network protocols or standards as well, such as the CSMA/CD protocol, Token Ring, FDDI, ATM, Fibre Channel, and other common network protocols, for example.

The network 14 may be compatible with widely utilized operating systems and applications, including upper layer protocol stacks such as TCP/IP, IPX, Netbui, DECnet, and others, for example. Other emerging new network standards may be utilized with network 14 as well, such as IEEE 802.1q or IEEE 802.1p for providing VLAN and explicit priority information for packets in the network. Further, other advanced signal processing techniques may be incorporated with the network 14 such as data compression to improve the effective bandwidth over the bandwidth fixed by physical limitations, for example MPEG-2 compression. Full-duplex operating modes for switch-to-switch and switch-to-end station connections are supported by network 14, including support for half-duplex operating modes if necessary for shared connections, such as when using repeaters or the CSMA/CD access method. The network 14 preferably utilizes fiber optic hardwire direct connections, but may also support Category 5 unshielded twisted-pair (UTP) or coaxial transmission lines.

Figure 2:
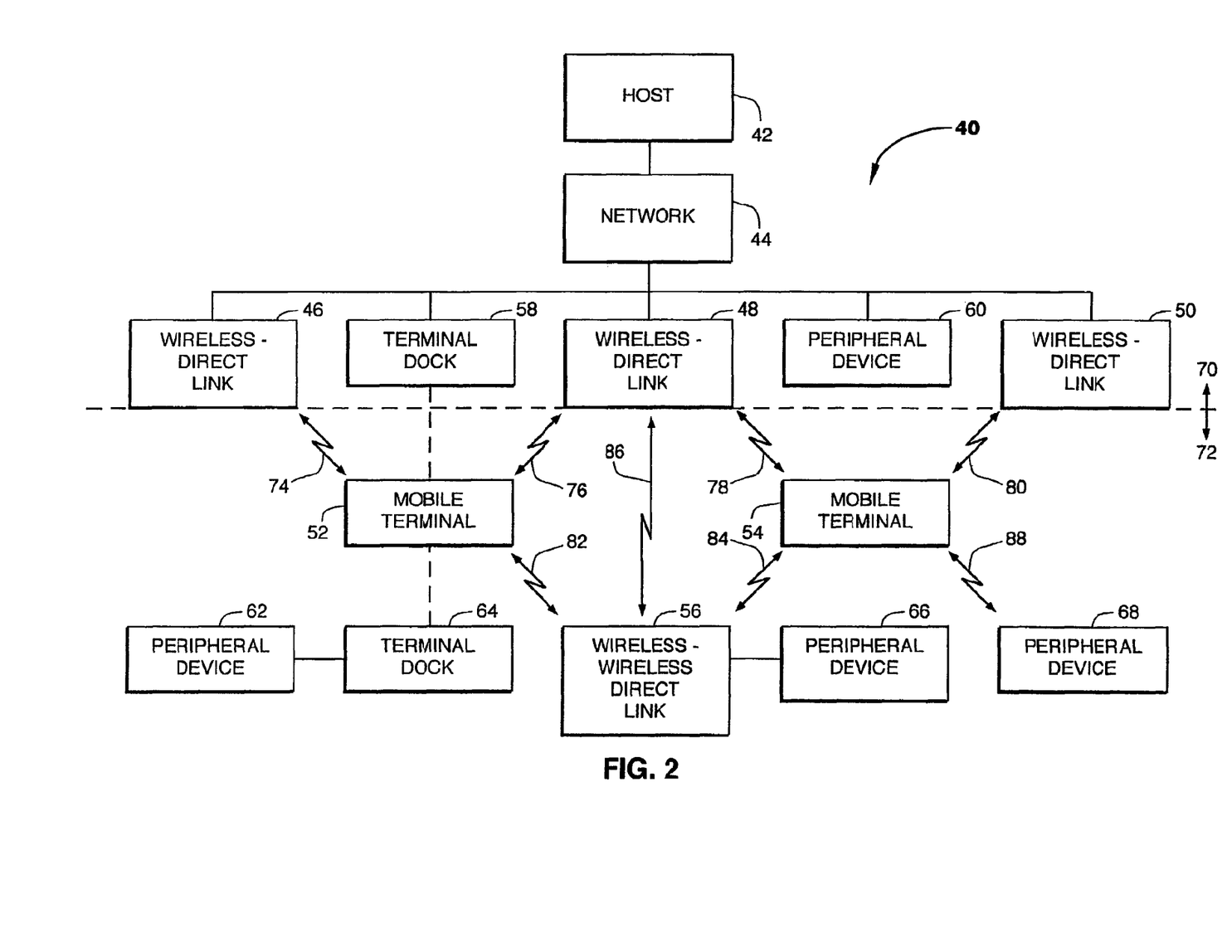
FIG. 2 is an illustration of a communications system of the present invention, further showing a hybrid wireless and direct link communications system.

Referring now to FIG. 2, a communications system of the present invention is shown, illustrating a hybrid wireless and direct link communications system. The communications system 40 may utilize a central host computer ("HOST") 42 and network ("NETWORK") 44 substantially similar to the host computer 12 and network 14 of FIG. 1. One or more access points may be utilized to provide multiple modes of access to the computer network 44. Access points or servers ("WIRELESS-DIRECT LINK") 46, 48 and 50 may provide an interface between a wired communications system 70 and a wireless communications system 72. Each of the access points 46, 48 and 50 for providing a wireless-to-direct system link may utilize a transceiver having diversity architecture in accordance with the present invention for communicating with mobile data terminals ("MOBILE TERMINAL") 52 and 54 which may be similarly equipped. Mobile terminals 52 and 54 may communicate over the network 44 by linking to the network through access points 46, 48 and 50 via communication links 74, 76, 78 and 80. Communication links 74, 76, 78 and 80 are preferably radio-frequency communication links. The overall effective roaming range of the mobile terminals 52 and 54 may be extended by utilization of an intermediate access point ("WIRELESS-WIRELESS LINK") 56 which provides a wireless-to-wireless communications link to the network 44. The mobile terminals 52 and 54 may communicate with the intermediate access point 56 via wireless communication links 82 and 84, respectively, which in turn communicates with a wireless-to-direct access point 48 via wireless communication link 86, which in turn directly communicates over the network 44.

The access points are preferably NORAND 6710 access points available from NORAND Corporation of Cedar Rapids, Iowa. The access points preferably operate with AMD 29200 RISC processors to implement a real-time multitasking operating system for servicing the radio, or wireless, network and the direct connection network (e.g., Ethernet). The access points may be managed by Simple Network Management Protocol (SNMP) version one (SNMPv1) or version two (SNMPv2) or the Common Management Information Protocol (CMIP) to allow configuration and access to network configurations such as the NORAND Enterprise Management Information Base. The access points may further include two PC Card (a.k.a. PCMCIA) version 2.0 or higher slots for accommodating Type II or Type III PC cards. The access points are preferably compatible with WLI Forum compatible devices. Structurally, the access points may comprise a housing meeting the NEMA Standard ICS-110, for example NEMA 4 which is watertight and dust-tight for indoor applications for protecting the access point equipment against splashing water, water seepage, falling water, hose-directed water and severe external water condensation. Alternatively, the housing of the access point may comprise and Intrinsically-Safe enclosure.

Mobile terminal 52 may be temporarily stationed in a terminal dock ("TERMINAL DOCK") 58 which may be directly linked to network 44, for example to provide batch type data transfer when not in use or when the wireless system 72 is shut down or not available. Further, mobile terminal 52 may be docked in terminal dock 64 so that the terminal may operate and communicate with peripheral device ("PERIPHERAL DEVICE") 62. Peripheral device 62 may be a printer, an independent computer, a battery charging power source, a vehicle, a workstation, etc. Additionally, terminal dock 64 and peripheral device 62 may be incorporated into a single physical unit such as a mobile printer having a terminal receiving receptacle and appropriate communications facilities. A peripheral device 66 similar to peripheral device 62 may be connected to intermediate access point 56 wherein mobile terminal 54 operates and communicates with peripheral device 66 via communication link 84.

Mobile terminal 54 may operate and communicate with peripheral device 68 via communication link 88. Peripheral device 68 may be a device similar to peripheral devices 62 and 66. Further, communication link 88 may one of several differing types of wireless links. For example, wireless link 88 may utilize infrared communications for providing a low power, short hop communication link. Alternatively, communication link 88 may be an optical link, or may be a radio-frequency link. Further, any of the wireless communications links 74, 76, 78, 80, 82, 84, 86 or 88 may implement one or more types of remote communications such as infrared, optical, radio-frequency, sonic, ultrasonic, magnetic, etc.

The wired communications system 70 and the wireless communications system 72 may utilize the NORAND Open Wireless LAN Network Management Application for providing network management functions. The network management platform may further incorporate HP OpenView for WINDOWS and NodeManager for HP-UX available from Hewlett-Packard Corporation (WINDOWS being a trademark of Microsoft Corporation).

Figure 3:
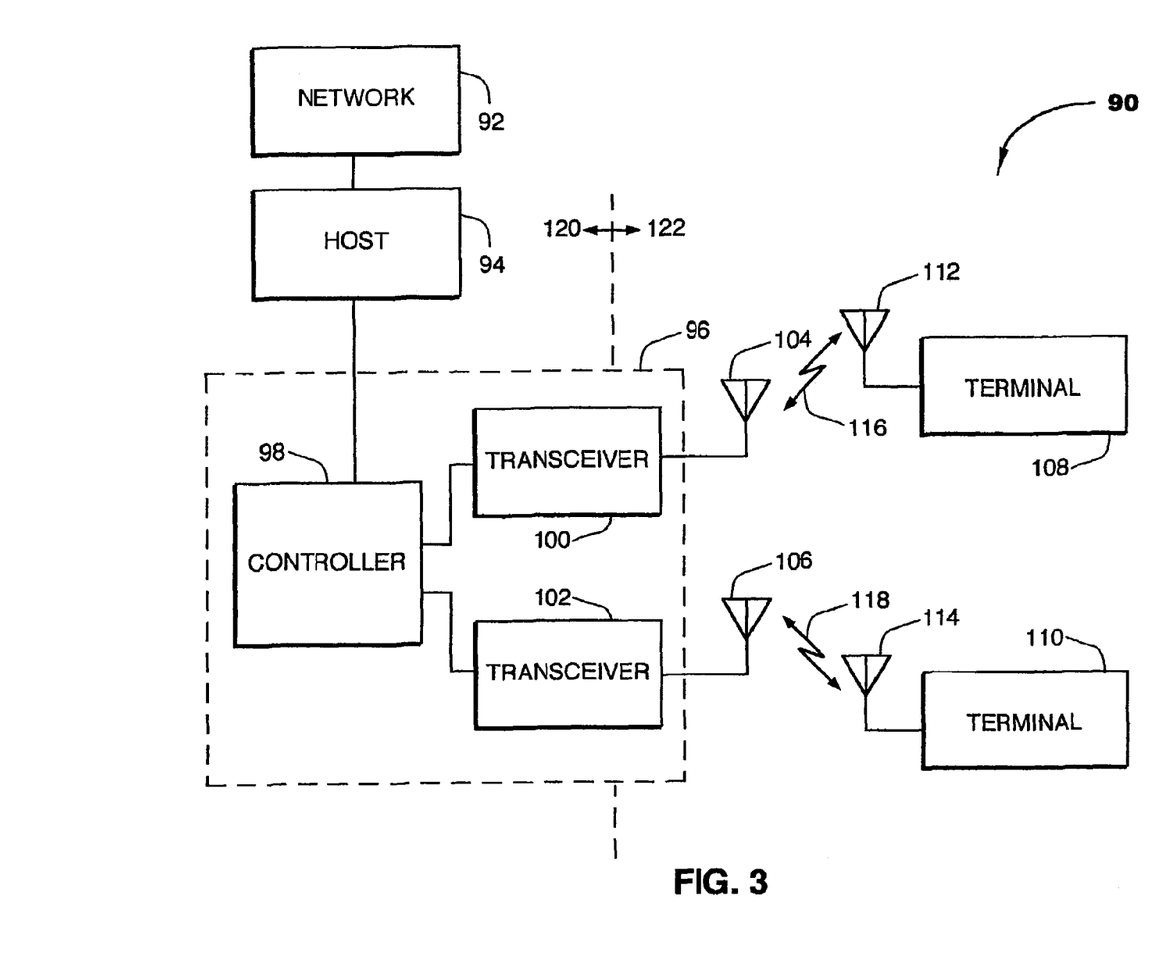
FIG. 3 is an illustration of a network access node of a communications system in accordance of the present invention, further showing the implementation of dual wireless communications transceivers.

Referring now to FIG. 3, a network access node of a communications system in accordance with the present invention is shown, illustrating the utilization of dual wireless communications transceivers. The communications system 90 of FIG. 3 may comprise a direct link communications system 120 and a wireless link communications system 122. The direct link communications system 120 may include a central host computer ("HOST") 92 implementing a computer network ("NETWORK") 94 substantially similar to networks 14 and 44 shown in FIGS. 1 and 2. Access point 96 communicates directly with the network 94 and may invariably utilize controller ("CONTROLLER") 98 for implementing the network interfacing functions. The access point 96 may also include dual transceivers ("TRANSCEIVER") 100 and 102 being ultimately connected to controller 98. The transceivers 100 and 102 may utilize wireless communications for operating over communications links 116 and 118. Transceivers 100 and 102 may utilize antennas 104 and 106, respectively, in the case where communications links 116 and 118 are radio-frequency communications links. In such a case, mobile terminals ("TERMINAL") 108 and 110 utilize antennas 112 and 114, respectively and of like kind, for radio-frequency communications over communications links 116 and 118.

Dual transceivers 100 and 102 may be utilized in a single access point 96 for varying purposes. For example, a first transceiver 100 may be utilized to communicate with the network at a first level of security and access in which only terminal 108 is allowed to communicate with transceiver 100. The operator of terminal 108 may have a higher level of access to the network 94 for performing administrative, supervisory, accounting, or programming type activities which may not be available to all terminal operators and which may be accessible only through transceiver 100 via link 116. The operator of terminal 110 may be provided with a lower level of access to network 94 and therefore may communicate only with transceiver 102 via link 118. Alternatively, multiple transceivers operating at different frequencies may be utilized in a single access point 96 to increase the number of usable channels and therefore the number of terminals operating in a single location. For example, transceiver 100 may accommodate up to 24 terminals and transceiver 102 may accommodate an additional 24 terminals for allowing the operation of a total of 48 terminals on the communication system 90.

The transceivers of FIG. 3 may operate on available frequencies unregulated or made widely available for commercial use by government agencies. For example, transceiver 100 may be a 2.4 GHz RangeLAN2 radio while transceiver 102 may be a Norand 900 MHz radio wherein both radios may be utilized simultaneously. The transceivers 100 and 102 may be PC card (a.k.a. PCMCIA) form factor radio cards conforming to PC Card standard version 2.0 or higher, for example. The transceivers 100 and 102 may be either WLI Forum or IEEE 802.11 compatible radios.

Figure 4:
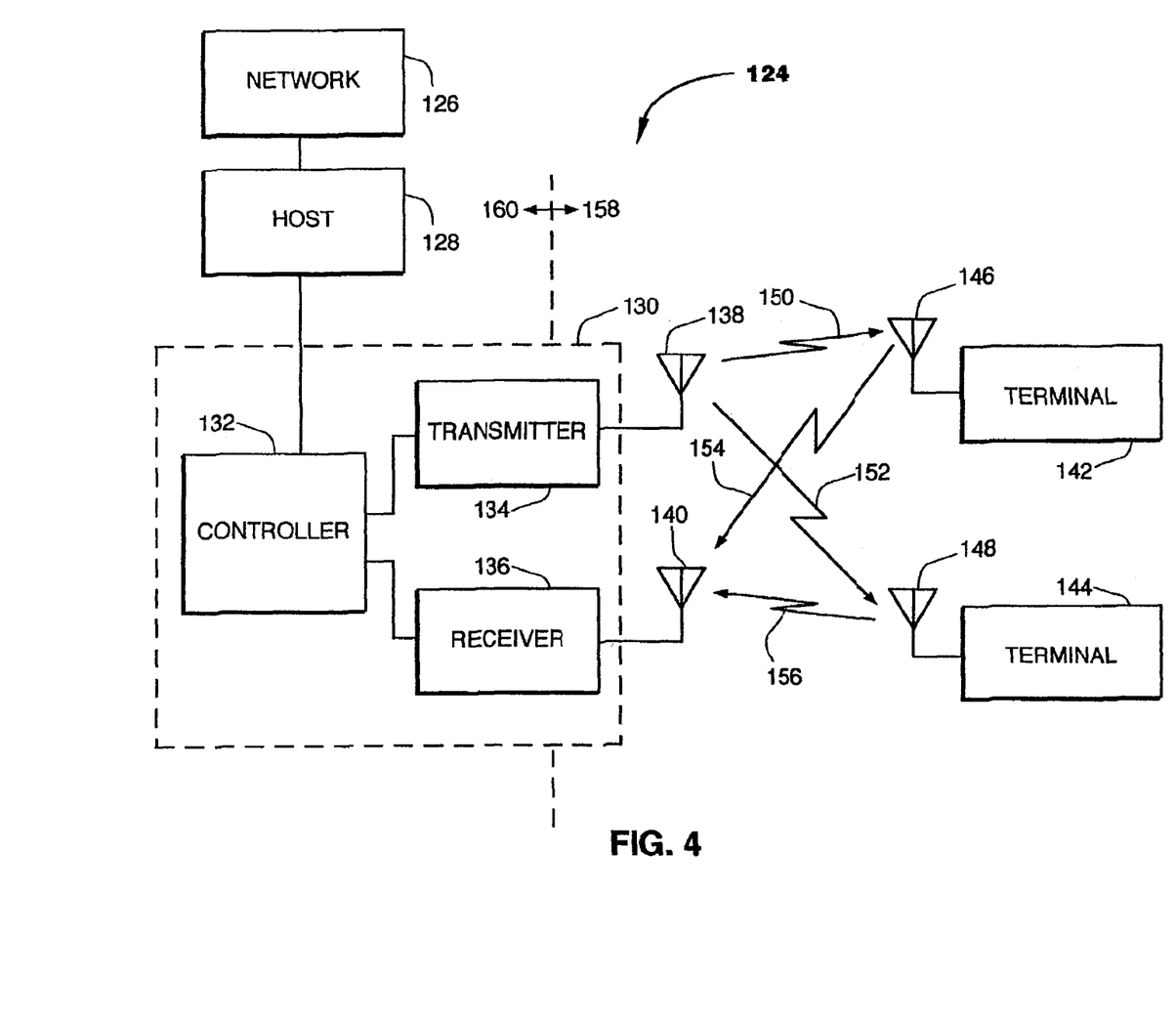
FIG. 4 is an illustration of an alternative configuration of the communication system of FIG. 3.

Referring now to FIG. 4, an alternative configuration of the communication system of FIG. 3 is shown. The network 124 may comprise a host computer ("HOST") 126 implementing a computer network ("NETWORK") 128. An access point 130 may communicate with the direct link communications system 160 via a controller ("CONTROLLER") 132 operationally connected to the network 128. The access point 130 utilizes a transmitter ("TRANSMITTER") 134 and a receiver ("RECEIVER") 136, which are ultimately connected to controller 132 for communicating over wireless communications system 158. The transmitter 134 may be a dedicated transmitter for performing communications transmissions to mobile terminals ("TERMINAL") 142 and 144 via communications links 150 and 152. Conversely, receiver 136 may be a dedicated receiver for receiving data communications from mobile terminals 142 and 144 via communications links 154 and 156. In the instance in which communications links 150, 152, 154 and 156 are radio-frequency links, antennas 138, 140, 146 and 148 may be utilized by transmitter 134, receiver 136, terminal 142 and terminal 148 respectively.

Access point 130 may utilize a dedicated transmitter 134 and a dedicated receiver 136 for varying purposes. For example, the hardware of the transceiver 134 may be optimized for data transmissions whereas the hardware of the receiver 136 may be optimized for data receptions, which may require different hardware designs. Other inherent advantages may be further realized. For example, isolation of the output stages of the transmitter 134 from the input stages of the receiver 136 will prevent noise in the output of the transmitter 134 from being introduced onto the received communications signal and inadvertently amplified by the input stages of the receiver 136. Additionally, full duplex transmissions and true multitasking operations may be implemented such that access point 130 may simultaneously upload and download data to terminals 142 and 144.

Figure 5:
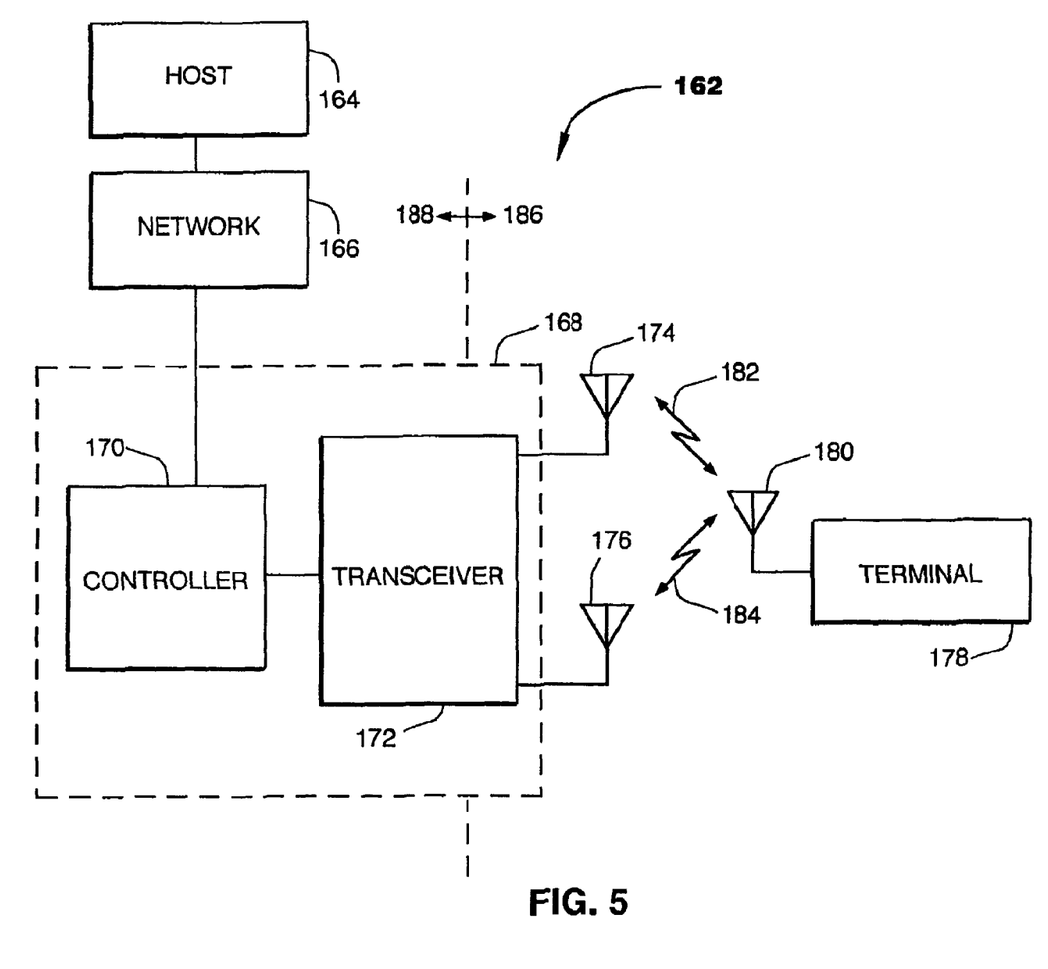
FIG. 5 is an illustration of a communication system of the present invention, further showing a diversity architecture transceiver.

Referring now to FIG. 5, a communication system of the present invention is shown utilizing a transceiver having diversity architecture. The communications system 162 may comprise a host computer ("HOST") 164 implementing a computer network ("NETWORK") 166. Access point 168 communicates with the network via controller 170 via direct link communications system 188. Access point 168 utilizes a diversity architecture transceiver 172 in accordance with the present invention, the diversity architecture transceiver being ultimately connected to controller ("CONTROLLER") 170. The diversity architecture transceiver ("TRANSCEIVER") 172 may utilize two antennas 174 and 176 which may be integrated as a dual antenna. The diversity architecture transceiver 172 communicates with mobile terminal ("TERMINAL") 178 via wireless communications links 182 and 184 wherein terminal 178 utilizes an antenna 180 of like kind to antennas 174 and 176 when communications links 182 and 184 are radio-frequency communications links. Access point 168 may utilize one or more diversity architecture transceivers 172 for any one or more varying purposes, including reasons set forth in the description to FIGS. 1-4.

Figure 6:
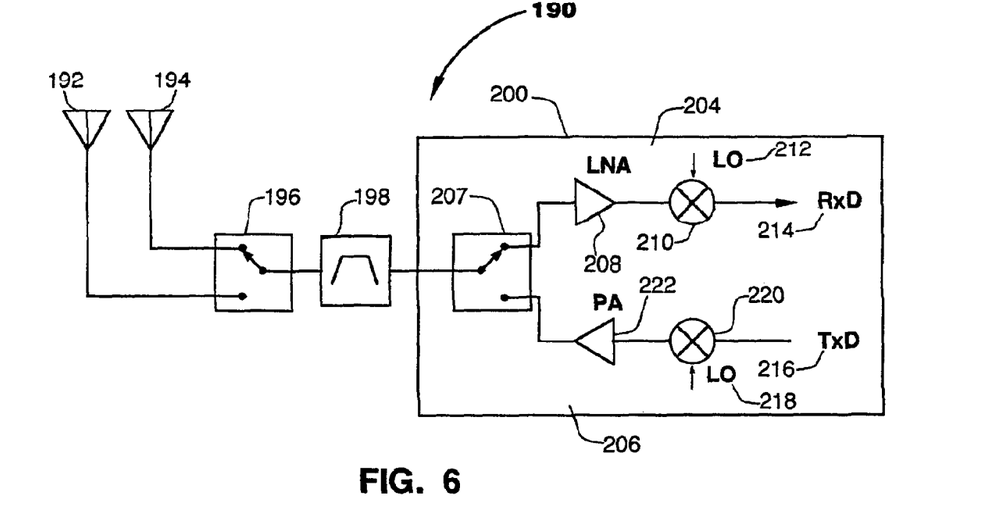
FIG. 6 is an illustration of standard architecture for implementing a diversity architecture transceiver in accordance with the present invention.

Referring now to FIG. 6, standard architecture is shown for implementing a transceiver having diversity architecture. The standard transceiver 190 may utilize first and second antennas 192 and 194 being connected to a single pole, double throw (SPDT) switch 196 for selection of one antenna or the other.

The switch 196 feeds into a bandpass filter 198 which in turn feeds into the transceiver hardware 200. At the input of the transceiver hardware, the bandpass filter feeds into a single pole, double throw switch 202 which is used to select between receiver front end hardware 204 and transmitter back end hardware 206. When the switch 202 is set to select receiver hardware 204, the output of the bandpass filter 198, after being received by the selected one of the two antennas 192 and 194 with switch 196 and after passing through bandpass filter 198, feeds into a low noise input amplifier ("LNA") 208 which in turn feeds into mixer 210. The mixer 210 combines received input signals with the output of a receiver local oscillator ("LO") 212 to provide a receiver data signal ("RxD") 214. When switch 202 is set to select transmitter back end hardware 206, a transmit data signal ("TxD") 216 is combined with the output of a transmitter local oscillator 218 using mixer 220. The output of mixer 220 feeds into a transmitter power amplifier ("PA") 222, the output of which feeds into the selected antenna 192 or 194 via switch 196 after being fed through filter 198.

Figure 7:
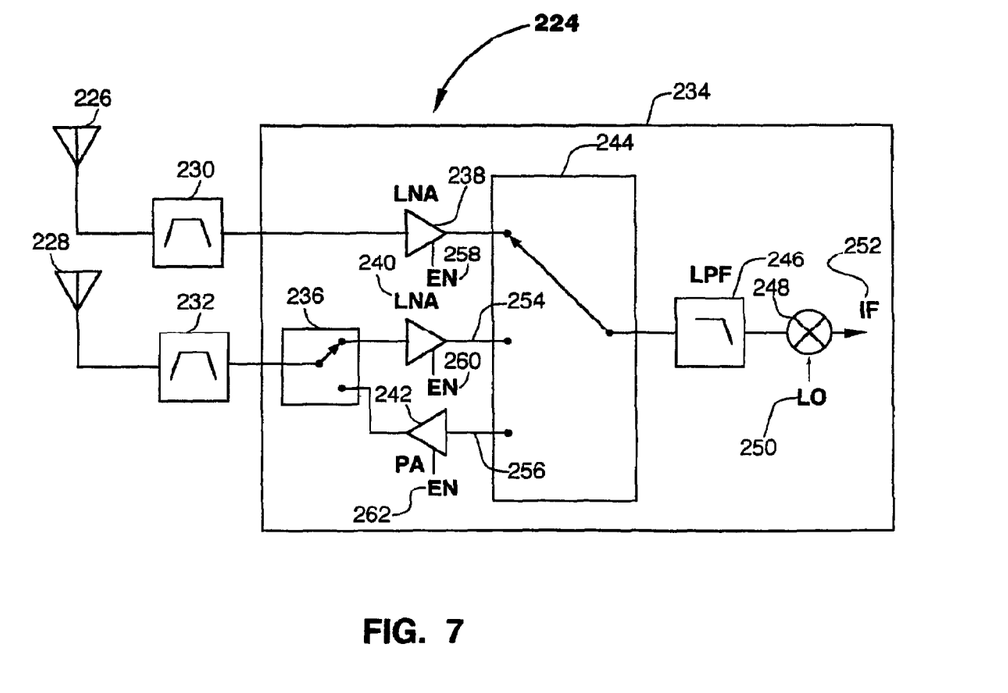
FIG. 7 is an illustration of improved architecture for implementing a diversity architecture transceiver in accordance with the present invention.

Referring now to FIG. 7, improved architecture for implementing a transceiver having diversity architecture in accordance with the present invention is shown. The diversity architecture transceiver 224 may utilize multiple antennas 226 and 228 as discussed, supra. A first antenna 226 maybe utilized to receive a radio-frequency signal. The signal received by antenna 226 may be bandpass filtered by filter 230, the output of which is fed into the transceiver hardware 234. Within the transceiver hardware 234, the output of the bandpass filter may be fed into a low noise amplifier ("LNA") 238.

A second antenna 228 may be further utilized which is capable of being used for receiving and transmitting purposes. Antenna 228 connects to bandpass filter 232 to filter out signals lying outside of the pass band frequency range for either transmitted or received signals. Bandpass filter 232 connects to a single pole, double throw switch 236 within the transceiver hardware 234. Switch 236 selects between receiving functions 254 and transmitting functions to be performed using antenna 228. When switch 236 is set to select receiving functions 254, bandpass filter 232 feeds into a low noise amplifier ("LNA") 240. When switch 236 is set to select transmitting functions 256, a transmitting power amplifier ("PA") 242 is selected for the transmitter output signal path.

Within the transceiver hardware 234, a single pole, triple throw switch 244 selects between receiving signals via antenna 226, receiving signals via antenna 228, or transmitting signals via antenna 228. Switch 246 connects to low pass filter 246 which in turn connects to mixer 248 for combining received signals with the output of a local oscillator 250 to produce intermediate frequency signals 252, and vice versa for transmitted signals.

It has been discovered that the transceiver having diversity architecture of FIG. 7 provides at least a two decibel improvement in the transceiver noise figure resulting from effectively placing switch 196 of FIG. 6 after the low noise amplifiers as illustrated in FIG. 7. Further, enable signals ("EN") 258, 260 and 262 may be provided to amplifiers 238, 240 and 242, respectively, to turn off the amplifiers when not in use so as to not introduce any interfering noise in the activated amplifiers.

Figure 8:
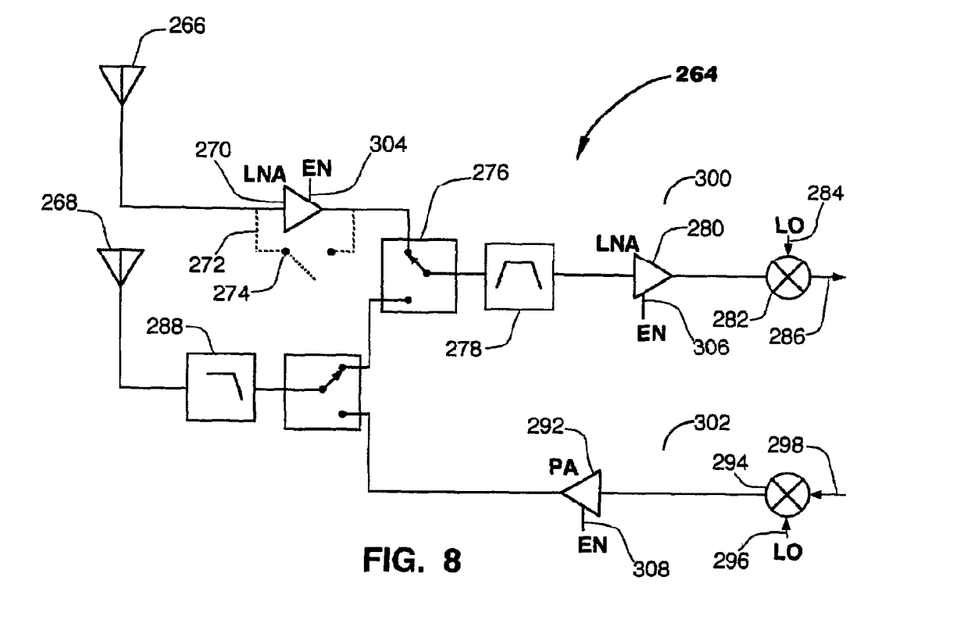
FIG. 8 is an illustration of an alternative transceiver architecture of the present invention having improved receiver sensitivity and interference rejection.

Referring now to FIG. 8, an alternative transceiver architecture of the present invention is shown having improved receiver sensitivity and interference rejection. Transceiver 264 may utilize multiple antennas 266 and 268 for reasons as set forth, supra. A first antenna 266 may be utilized for receiving input signals and may feed directly into a low noise amplifier ("LNA") 270. Amplifier 270 may operate in the open loop mode, or may operate in the closed loop mode as shown by feedback loop 272 in dashed lines. Switching between open loop and closed loop modes for amplifier 270 may be accomplished via a single pole, single throw (SPST) switch 274 in feedback loop 272.

The output of amplifier 270 preferably feeds into a single pole, double throw switch 276 which may be utilized to select between the utilization of antennas 266 or 268 for signal receiving purposes. Switch 276 connects to bandpass filter 278 which in turn feeds into a low noise amplifier ("LNA") 280. The output of amplifier 280 feeds into mixer 282 where received signals are combined with local oscillator 284 to produce intermediate frequency signals 286.

Antenna 268 may be utilized for either receiving or transmitting signals. Antenna 268 connects to low pass filter 288 which in turn connects to a single pole, double throw switch 290. Switch 290 may be utilized to selectively connect antenna 268 to receiver hardware 300 or transmitter hardware 302. When switch 290 is set to select receiver hardware 300, switch 290 connects antenna 268 through filter 288 to switch 276. When switch 290 is set to select transmitter hardware 302, switch 290 connects to the output of transmitter power amplifier ("PA") 292. Power amplifier 292 receives the output of mixer 294 which combines intermediate frequency signals with the output of a transmitter local oscillator ("LO") 296.

It has been discovered that better receiver sensitivity over the standard transceiver design, such as shown in FIG. 6, through antenna 266 may be attained by the diversity architecture of FIG. 8. Further, the architecture of FIG. 8 provides better interference rejection of signals received with antenna 268 than with the standard transceiver design. Additionally, less power output of the power amplifier 292 of the transmitter section 302 is required since the amplifier is driving a low pass filter having a one-half decibel loss versus the three decibel loss of the bandpass filter 198 of the standard design. Further, each amplifier 270, 280 and 292 may be selectively activated with enable signals 304, 306 or 308, respectively, such that noise will not be inadvertently interfere with the activated amplifier or amplifiers.

Figure 9:
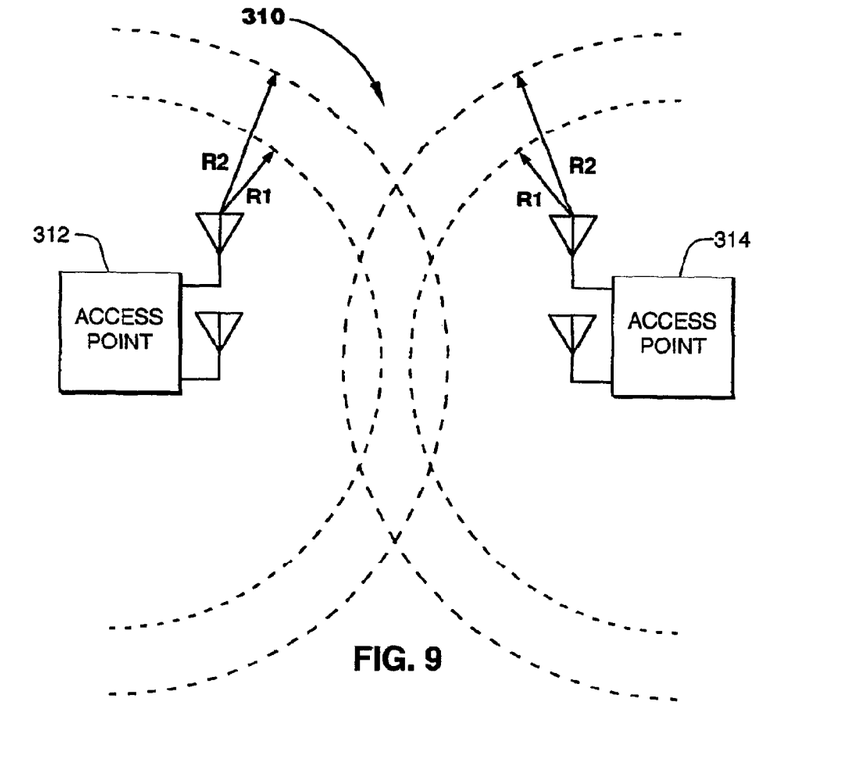
FIG. 9 is an illustration of multiple access points utilizing communication transceivers of the present invention.

Referring now to FIG. 9, multiple access points utilizing communication transceivers of the present invention are shown. In FIG. 9, a wireless communication operation 310 between dual access points 312 and 314 is shown. Such an operation 310 maybe substantially similar to communications between access points 48 and 56 of FIG. 2 showing a wireless communications link 86 between the two access points. R1 may represent one-half of the maximum operating distance between two given access points utilizing standard architecture transceivers such as shown in FIG. 6. Thus, radius R1 may be considered to represent the given operating radius attributed to an individual access point for a standard architecture transceiver. Radius R2 may be considered to represent the given operating radius attributed to an individual access point when a transceiver having the diversity architecture of the present invention, such as transceiver 224 of FIG. 7 or transceiver 264 of FIG. 8.

As illustrated in FIG. 9, access points 312 and 314 may be set apart a given distance wherein the operating radii R1 of the access points do not overlap when utilizing standard transceiver architecture, and no wireless communications between access points 312 and 314 may occur. However, because the operating radii R2 of the access points do overlap at the distance depicted in FIG. 9, wireless communications between access points 312 and 314 may occur. Thus, as illustrated, the improved transceiver architecture of the present invention provides for an increased operational range of the transceivers for a given maximum broadcasting power.

Maximum broadcasting powers are typically mandated by governmental agencies, therefore the capability of increasing operational range of wireless communications without increasing broadcasting power is highly advantageous.

It is believed that the improved receiver sensitivity for a diversity architecture transceiver of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. In a communications system,
   a first antenna connected to a first amplifier;
   a second antenna;
   an intermediate frequency stage connected to a second amplifier; and
   a selector disposed between said first amplifier and said intermediate frequency stage and between said second antenna and said second amplifier for selecting operation of the communications system between a first receiving mode using said first antenna and a second receiving mode using said second antenna;
   said first amplifier including a feedback loop for altering the operational characteristics of said first amplifier, said feedback loop being selectively open and closed such that in the first receiving mode, the signal receiving path between the first antenna and said intermediate frequency stage has two respective different signal processing characteristics for a given radio signal at the first antenna.

2. In a communications system as claimed in claim 1, the signal receiving path from the first antenna to the intermediate frequency stage in the first receiving mode has a different signal processing characteristic than the signal receiving path from the second antenna to the intermediate frequency stage in the second receiving mode, for the case where the feedback loop is selectively closed, and for the case where the feedback loop is selectively open.

3. In a communications system,
   (a) a first antenna and a second antenna for selective receiving operation;
   (b) an intermediate frequency stage for selective connection with the first antenna in a first receiving mode, to activate a first signal receiving path, and for selective connection to the second antenna in a second receiving mode, to activate a second signal receiving path;
   (c) wherein the first signal receiving path which extends from the first antenna to the intermediate frequency stage when activated in the first receiving mode provides a substantially different signal processing characteristic between the first antenna and the intermediate frequency stage than a signal processing characteristic provided between the second antenna and the intermediate stage by the second signal receiving path which extends from the second antenna to the intermediate frequency stage when activated in the second receiving mode.

4. In a communications system as claimed in claim 3, the first signal receiving path extending continuously between the first antenna and the intermediate frequency stage when activated and including an amplifier which provides a different signal processing characteristic than the second signal receiving path extending continuously between the second antenna and the intermediate frequency stage when activated, which lacks an amplifier.

5. In a communications system as claimed in claim 3, the first signal receiving path extending continuously between the first antenna and the intermediate frequency stage when activated in the first receiving mode, the second signal receiving path extending continuously between the second antenna and the intermediate frequency stage when activated in the second receiving mode and having a low pass filter therein, while the first signal receiving path extending continuously between the first antenna and the intermediate frequency stage when activated in the first receiving mode lacks a low pass filter.

6. In a communications system according to claim 3, the first signal receiving path comprising an amplifier for the received radio signal with a feedback loop for providing the first signal receiving path with different amplification-characteristics than the second signal receiving path which lacks a corresponding-amplifier.

7. In a communications system as claimed in claim 3, the first signal receiving path from the first antenna to the intermediate frequency stage when activated in the first receiving mode providing an enhanced receiver sensitivity characteristic, and the second signal receiving path from the second antenna to the intermediate frequency stage when activated in the second receiving mode providing enhanced interference rejection of signals received by the second antenna.

8. In a communications system as claimed in claim 3, a selector system for selecting respectively the first and second signal receiving paths, said first and second antennas supplying a given incoming radio signal to the first and second signal receiving paths, respectively, and a low noise amplifier in the first signal receiving path between the first antenna and the selector system to provide a different signal processing characteristic for the given incoming radio signal in the first signal receiving path than in the second signal receiving path which lacks a low noise amplifier between the second antenna and the selector system.

9. In a communications system as claimed in claim 8, a transmitter for coupling with the second antenna, the selector system in a transmit mode connecting the transmitter with the second antenna via a transmit circuit, and a low pass filter between the second antenna and the selector system for filtering the incoming radio signal from the second antenna in receiving mode when the second signal receiving path is selected, while being present in the transmit circuit and reducing the loss in transmit mode in comparison with the use of a bandpass filter.

10. In a communications system as claimed in claim 5, the first signal receiving path extending continuously between the first antenna and the intermediate frequency stage when activated and including an amplifier which provides a different signal processing characteristic than the second signal receiving path extending continuously between the second antenna and the intermediate frequency stage when activated, which lacks an amplifier.

11. In a communications system according to claim 5, the first signal receiving path comprising an amplifier for the received radio signal with a feedback loop for providing the first signal receiving path with different amplification characteristics than the second signal receiving path which lacks a corresponding amplifier.

12. In a communications' system as claimed in claim 5, the first signal receiving path from the first antenna to the intermediate frequency stage when activated in the first receiving mode providing an enhanced receiver sensitivity characteristic, and the second signal receiving path from the second antenna to the intermediate frequency stage when activated in the second receiving mode providing enhanced interference rejection of signals received by the second antenna.

13. In a communications system,
   a first antenna and a second antenna for selective operation in receiving mode;
   a selector system for selective connection with the first antenna in a first receiving mode, to activate a first signal receiving path, and for selective connection to the second antenna in a second receiving mode, to activate a second signal receiving path;
   wherein the first and second signal receiving paths extend continuously between the first and second antennas, respectively, and the selector system, when activated, and include different types of components, such that the first signal receiving path when activated in the first receiving mode has a substantially different signal transmission characteristic than the second signal receiving path when activated in the second receiving mode;
   the first signal receiving path comprising an amplifier for the received radio signal with a feedback loop for providing a signal receiving path with different amplification characteristics than the second signal receiving path which lacks a corresponding amplifier.

14. In a communications system according to claim 13, said feedback loop being selectively open and closed such that in the first receiving mode, the signal receiving path between the first antenna and the selector system has two respective different signal processing characteristics for a given radio signal at the first antenna.

15. In a communications system,
   a first antenna and a second antenna for selective operation in receiving mode;
   a selector system for selective connection with the first antenna in a first receiving mode, to activate a first signal receiving path, and for selective connection to the second antenna in a second receiving mode, to activate a second signal receiving path;
   wherein the first and second signal receiving paths extend continuously between the first and second antennas, respectively, and the selector system, when activated, and include different types of circuit components, such that the first signal receiving path when activated in the first receiving mode has a substantially different signal transmission characteristic than the second signal receiving circuit path when activated in the second receiving mode;
   the second signal receiving path extending continuously between the second antenna and the selector system when activated in the second receiving mode having a low pass filter therein, while the first signal receiving path extending continuously between the first antenna and the selector system when activated in the first receiving mode lacks a low pass filter;
   the first signal receiving path comprising an amplifier for the received radio signal with a feedback loop for providing a signal receiving path with different amplification characteristics than the second signal receiving path which lacks a corresponding amplifier.

16. In a communications system according to claim 15, said feedback loop being selectively open and closed such that in the first receiving mode, the signal receiving path between the first antenna and the selector system has two respective different signal processing characteristics for a given radio signal at the first antenna.

* * * * *